United States Patent
Maniyar et al.

(10) Patent No.: US 11,700,173 B2
(45) Date of Patent: Jul. 11, 2023

(54) DYNAMIC USER PRIVATE NETWORKS OF A SHARED VIRTUAL NETWORK

(71) Applicant: Cisco Technology, Inc., San Jose, CA (US)

(72) Inventors: Shyamsundar N. Maniyar, San Jose, CA (US); Sanjay Kumar Hooda, Pleasanton, CA (US); Shree N. Murthy, San Jose, CA (US); Sonal Prem Kumar Chhabria, San Jose, CA (US); Akshay Dorwat, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 16/948,627

(22) Filed: Sep. 25, 2020

(65) Prior Publication Data

US 2022/0103424 A1 Mar. 31, 2022

(51) Int. Cl.
*H04L 41/0813* (2022.01)
*H04L 12/46* (2006.01)
*H04L 67/306* (2022.01)

(52) U.S. Cl.
CPC ...... *H04L 41/0813* (2013.01); *H04L 12/4641* (2013.01); *H04L 67/306* (2013.01); *H04L 2212/00* (2013.01)

(58) Field of Classification Search
CPC ............. H04L 41/0813; H04L 12/4641; H04L 67/306; H04L 2212/00; H04L 41/0897; H04L 45/64
See application file for complete search history.

(56) References Cited

U.S. PATENT DOCUMENTS

| 10,313,224 | B2 * | 6/2019 | Srinivasan | .............. H04L 45/48 |
| 10,419,992 | B2 * | 9/2019 | Van der Merwe | .... H04L 41/083 |
| 11,050,655 | B2 * | 6/2021 | Zeng | ...................... H04L 45/02 |

(Continued)

OTHER PUBLICATIONS

S. Homchaudhuri and M. Foschiano, "Cisco Systems' Private VLANs: Scalable Security in a Multi-Client Environment," RFC 5517, Feb. 2010, The Internet Society, Reston, VA, USA (twelve pages).

(Continued)

*Primary Examiner* — Javier O Guzman
(74) *Attorney, Agent, or Firm* — Polsinelli (57) ABSTRACT

In one embodiment, dynamic user private networks are virtually segmented within a shared virtual network. A network control system maintains the dynamic logical segmentation of the shared virtual network. User entities (e.g., user devices and/or services) are communicatively coupled to respective personal virtual networks via endpoints of access devices. Each of these endpoints is associated with a corresponding user private network. Responsive in real-time to automated processing of a received electronic particular user request, the network control system automatically modifies the dynamic logical segmentation of the shared virtual network to move a particular user entity on the shared virtual network to newly being on the first dynamic user private network without being disconnected from the shared virtual network. One embodiment uses different user private network identifiers (UPN-IDs) associated with endpoints and received packets to identify their respective user private network.

20 Claims, 8 Drawing Sheets

(56) References Cited

U.S. PATENT DOCUMENTS

| | | | |
|---|---|---|---|
| 11,570,151 B2* | 1/2023 | Walker | H04L 63/10 |
| 2003/0140131 A1* | 7/2003 | Chandrashekhar | H04L 63/0272 709/223 |
| 2004/0249973 A1* | 12/2004 | Alkhatib | H04L 67/563 709/245 |
| 2005/0195767 A1* | 9/2005 | Rahman | H04W 12/02 370/389 |
| 2007/0058638 A1* | 3/2007 | Guichard | H04L 12/4641 370/395.31 |
| 2010/0124191 A1* | 5/2010 | Vos | H04L 67/55 370/328 |
| 2011/0085470 A1* | 4/2011 | Park | H04L 65/1069 370/254 |
| 2011/0265174 A1* | 10/2011 | Thornton | H04L 67/63 709/201 |
| 2018/0351904 A1* | 12/2018 | Mizik | G06F 9/445 |
| 2019/0215303 A1 | 7/2019 | Appala et al. | |
| 2021/0119961 A1* | 4/2021 | Thunga | H04L 61/4511 |

OTHER PUBLICATIONS

Mahalingam et al., "Virtual eXtensible Local Area Network (VXLAN): A Framework for Overlaying Virtualized Layer 2 Networks over Layer 3 Networks," RFC 7348, Aug. 2014, The Internet Society, Reston, VA, USA (twenty-two pages).

Lasserre et al., "Framework for Data Center (DC) Network Virtualization," RFC 7365, Oct. 2014, The Internet Society, Reston, VA, USA (twenty-six pages).

S. Deering and R. Hinden, "Internet Protocol, Version 6 (IPv6) Specification," RFC 8200, Jul. 2017, The Internet Society, Reston, VA, USA (forty-two pages).

Smith et al., "Scalable-Group Tag eXchange Protocol (SXP)," draft-smith-kandula-sxp-10, May 24, 2020, The Internet Society, Reston, VA, USA (fifty-six pages).

M. Smith and L. Kreeger, "VXLAN Group Policy Option," draft-smith-vxlan-group-policy-05, Oct. 22, 2018, The Internet Society, Reston, VA, USA (six pages).

"Inter-Switch Link and IEEE 802.1Q Frame Format," Aug. 25, 2006, Document ID: 17056, Cisco Systems, Inc., San Jose, CA USA (eight pages).

"Software-Defined Access 1.0," 2018, https://www.cisco.com/c/dam/en/us/solutions/collateral/enterprise-networks/software-defined-access/white-paper-c11-740585.pdf, Cisco Systems, Inc., San Jose, CA USA (thirty-five pages).

"Cisco Group Based Policy Release 6.5, System Bulletin (inclusive of TrustSec Software-Defined Segmentation)," Aug. 3, 2020, https://www.cisco.com/c/dam/en/us/solutions/collateral/enterprise-networks/trustsec/software-system-bulletin.pdf, Cisco Systems, Inc., San Jose, CA USA (nineteen pages).

"Configuring Private VLANs," May 7, 2019, Cisco Nexus 5000 Series Switch CLI Software Configuration Guide, Cisco Systems, Inc., San Jose, CA USA (twelve pages).

"Dynamic VLAN Assignment with Radius Server and Wireless LAN Controller Configuration Example," Sep. 24, 2012, Document ID: 71683, Cisco Systems, Inc., San Jose, CA USA (twenty-two pages).

Shawn Wargo, "Software Defined Access: Under the Hood," Jun. 2019, Cisco Live 2019—San Diego, Cisco Systems, Inc., San Jose, CA (seventy-three pages).

* cited by examiner

DYNAMIC USER PRIVATE NETWORKS OF A SHARED VIRTUAL NETWORK

TECHNICAL FIELD

The present disclosure relates generally to packet switching network communications, including, but not limited to, dynamically modifying logical segmentation of a shared virtual network providing migration of user entities among dynamic user private networks.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with dynamic user private networks segmented within a shared virtual network.

In one embodiment, by a network control system maintains dynamic logical segmentation, including a plurality of dynamic user private networks, of a shared virtual network overlaying a physical network comprising a plurality of network nodes. A plurality of user entities are communicatively coupled to respective personal virtual networks of the plurality of dynamic user private networks, with the plurality of dynamic user private networks including a first dynamic user private network, with a plurality of user accounts (including a first user account) associated with the shared virtual network. Responsive in real-time to automated processing of a received electronic particular user request, the network control system automatically modifies said dynamic logical segmentation to change a particular user entity from being on the shared virtual network but not on the first dynamic user private network to being on the first dynamic user private network without being disconnected from the shared virtual network. In one embodiment the received electronic particular user request indicates a request for the particular user entity to be placed on the first dynamic user private network.

In one embodiment, the first user account is owner of the first dynamic user private network; the plurality of user accounts includes a second particular user account owning a second dynamic user private network of the plurality of dynamic user private networks. In one embodiment, the particular user entity was on the second dynamic user private network when said modifying the logical segmentation was initiated. In one embodiment, the particular user entity is owned by the second user account; and wherein said modifying the logical segmentation does not move one or more other second entities owned by the second user account and currently being on the second dynamic user private network to being on the first dynamic user private network.

In one embodiment, the received electronic particular user request is sent from a first initiating user entity on the shared virtual network and owned by the first user account. In one embodiment, the first initiating user entity receives a second received request identifying a request for the particular user entity to be placed on the first dynamic user private network; and wherein said sending the received electronic particular user request is performed responsive to the second received response. In one embodiment, the first initiating user entity receives a second received request identifying a request for the particular user entity to be placed on the first dynamic user private network; and wherein said sending the received electronic particular user request is performed responsive to the second received response and authorizing user input on the first initiating user entity. In one embodiment, the received electronic particular user request is sent from a second initiating user entity on the shared virtual network and owned by the second user account.

In one embodiment, the particular user entity is a mobile device. In one embodiment, each of the plurality of dynamic user private networks is owned by a different user account of the plurality of user accounts. In one embodiment, each of the plurality of dynamic user private networks is associated with a unique User Private Network Identifier (UPN-ID); and the shared virtual network associates each packet received from an entity on one of the plurality of dynamic user private networks with said corresponding said unique UPN-ID.

One embodiment comprises the particular user entity, communicatively coupled to the first dynamic user private network via a first network access device of the plurality of network nodes, sending a first plurality of packets to a second user entity communicatively coupled to the first dynamic user private network via a second network access device of the plurality of network nodes. For each first particular original packet of the first plurality of packets received and after having identifying that the second user entity is associated with the first dynamic user private network, the first network access device encapsulating said first original particular packet in a particular encapsulating packet including said unique UPN-ID corresponding to the first dynamic user private network and then sending said particular encapsulating packet towards the second network access device. In one embodiment, said associating each said packet includes encapsulating said packet in an encapsulating packet including the corresponding said unique UPN-ID.

One embodiment includes: sending, by the particular user entity communicatively coupled to the first dynamic user private network via a first network access device of the plurality of network nodes, a first plurality of packets to a second user entity communicatively coupled to the first dynamic user private network via a second network access device of the plurality of network nodes; for each first particular original packet of the first plurality of packets received, the first network access device encapsulating said first original particular packet in a particular encapsulating packet including said unique UPN-ID corresponding to the first dynamic user private network and then sending said particular encapsulating packet towards the second network access device; and specific egress processing based on said unique UPN-ID corresponding to the first dynamic user private network by the second network access device for each received specific packet of the first plurality of packets. In one embodiment, said specific egress processing includes: dropping said received specific packet in response to said received specific packet not including said unique UPN-ID corresponding to the first dynamic user private network, and decapsulating an original packet from said received specific packet and forwarding the original packet to the second user entity responsive to said received specific packet including said unique UPN-ID corresponding to the first dynamic user private network.

In one embodiment, prior to said encapsulating said first original particular packet, the first network access device identifying that the second user entity is associated with said unique UPN-ID corresponding to the first dynamic user private network. One embodiment comprises: sending, by the particular user entity communicatively coupled to the first dynamic user private network via a first network access device of the plurality of network nodes, a first plurality of packets to a second user entity communicatively coupled to the first dynamic user private network via a second network access device of the plurality of network nodes; and for each first particular original packet of the first plurality of packets received and after having identifying that the second user entity is associated with the first dynamic user private network, the first network access device sending said first original particular packet, natively or in a particular encapsulating packet, towards the second network access device.

One embodiment includes a network, comprising: a plurality of physical network nodes providing a shared virtual network, and a network control system. In one embodiment, the plurality of provider network nodes uses filtering of packet traffic according to logical segmentation of the shared virtual network to provide a plurality of dynamic user private networks within the shared virtual network that prevents packets being communicated, not via a gateway device, between user entities associated with different dynamic user private networks of the plurality of dynamic user private networks, with each of the plurality of dynamic user private networks associated with a different user account of a plurality of user accounts of the shared virtual network, with each of the plurality of dynamic user private networks associated with one or more logical or physical access points, and with the plurality of dynamic user private networks communicatively coupling entities via said logical or physical access points on respective user private networks of the plurality of dynamic user private networks. In one embodiment, the network control system, responsive in real-time to automated processing of received electronic dynamic user private network modification requests received from corresponding particular user accounts of the plurality of user accounts, performing automated modification of said logical segmentation of the shared virtual network defining which logical or physical access points of the shared virtual network belong to which of the plurality of dynamic user private networks.

In one embodiment, said automated modification of said logical segmentation of the shared virtual network includes changing a particular logical or physical access points from being associated with a specific to a different dynamic user private network of the plurality of dynamic user private networks for one or more of said received electronic dynamic user private network modification requests.

In one embodiment, said filtering of packet traffic includes dynamic user private network egress packet filtering of each particular packet of a plurality packets based on a matching of a packet marking User Private Network Identifier (UPN-ID) associated with said logical or physical access points on which said particular packet was received from a sending user entity, and an egress UPN-ID associated with said logical or physical access points from which said particular packet is to be communicated to a receiving user entity. The packet marking UPN-ID is added to said particular packet or included in an encapsulating packet encapsulating said particular packet.

2. Example Embodiments

Disclosed are, inter alia, methods, apparatus, computer-storage media, mechanisms, and means associated with dynamic user private networks segmented within a shared virtual network, with a network control system maintaining dynamic logical segmentation of the shared virtual network that provides a plurality of dynamic user private networks. The term "virtual private network" (VPN) is used herein to refer to a logically segmented overlay network including, but not limited to, using traditional (VPN) technologies, Software Defined Networking (SDN), etc.

The terms "dynamic user private networks," "private network" and "user private networks" and abbreviation "UPN" are used interchangeably herein.

An "endpoint" of an access device is a physical, virtual, or logical port; service set identifier (SSID); or other virtual or physical identifiable element that is used by a physical or virtual access device (e.g., fabric edge device, wireless access point) in differentiating packet traffic among subdomains (e.g., common virtual network, dynamic user private network) of the shared virtual network. In one embodiment, an endpoint is associated with no UPN-ID or one UPN-ID. In one embodiment, an endpoint is associated with no UPN-ID, or one or more UPN-IDs.

An "entity" (e.g., user entity, common entity) is a particular logical or physical unit that communicates with an endpoint of the shared virtual network. An entity includes, but is not limited to, a dedicated wired or wireless/mobile device (e.g., smartphones, laptops, hosts, servers), and sub-units of a wired or wireless/mobile device (e.g., applications, resources, virtual machines).

A "user account" is established means for entities of a user to gain access to the shared virtual network and its resources. Usually created by a network administrator, a user account includes information about the user, inter alia, password, rights, permissions, ownership of user private networks and entities.

In one embodiment, the shared virtual network is logically segmented to include a common virtual network and multiple dynamic user private networks. Dynamic user private networks provide an additional hierarchical layer of segmentation of a shared virtual network implemented by network provider equipment. Selective endpoints of physical wireless and wired access devices are associated with corresponding user private networks, the common network, another segmentation, or the entire shared virtual network. The shared virtual network provides communication of packet traffic among endpoints within a user private network, and among endpoints of each user private network and common virtual network. Packet traffic between endpoints of two different private networks is communicated via a gateway device. Thus in one embodiment, unicast, broadcast, and multicast packets are forwarded and flooded within a user private network, with packets destined for a different user private network forwarded through a router.

One embodiment adds a corresponding User Private Network Identifier (UPN-ID) to each packet arriving on a dynamic user private networks (e.g., by an access device/endpoint). In one embodiment, the use of UPN-IDs in the network is in addition to independent group-based policy segmentation (e.g., using Scalable/Security Group Tags (SGTs)) or network segmentation (e.g., Virtual Routing and Forwarding (VRF) or Virtual Networks (VNs)). In one embodiment, each particular UPN-ID is valid only within a single VRF/VN and same group (e.g., as identified by a same SGT). In one embodiment, a particular UPN-ID is valid across one or more VRFs/VNs and/or one or more different groups (e.g., as identified by corresponding SGTs).

One embodiment provides for user-initiated requests resulting in automated changes (for authorized requests) to which endpoints, and thus, which user entities are on a dynamic user private network. To effectuate a change in which dynamic user private network a particular user entity is currently on, the network control system modifies the dynamic logical segmentation of the shared network by associating a different UPN-ID (that of the new user private network) with the endpoint/access device with which the particular user entity is communicatively coupled to the network. Thus, the same endpoint/access device adds the different UPN-ID to packets subsequently received from the particular user entity. Note, as used herein, adding the UPN-ID to a packet includes directly adding the UPN-ID to a packet, or encapsulating the packet and adding the UPN-ID to the encapsulating packet.

One embodiment performs egress filtering on each specific packet before they egress a particular endpoint/access device using a single matching operation between the specific UPN-ID assigned to the particular endpoint/access device and that contained in the specific packet. If they do not match, the packet is dropped; otherwise, the original packet (typically after decapsulation from the encapsulating packet) is sent from the particular endpoint/access device. This comparing of two UPN-ID's is efficient in both processing and storage, as only a single compare operation is required (e.g., in contrast to processing requirements of an access control list).

As disclosed herein, automated dynamic virtual networks increase the operating efficiency of the network by not requiring network operator/administrator manual intervention to change the corresponding logical segmentation of the shared virtual network. Also, the moving of a particular user entity onto a particular dynamic user private network is efficient as the particular user entity maintains its association with the shared virtual network. In other words, moving among dynamic virtual private networks does not require the particular user entity to be dropped from, or re-authenticated/re-attached to the shared virtual private network; rather, one embodiment simply changes the UPN-ID associated with the endpoint of the particular dynamic user private network communicatively coupled with the particular user entity.

In one embodiment, dynamic virtual private networks also providing increased network security by their additional micro-segmentation that isolates packet traffic of different dynamic virtual private networks, while allowing inter-private virtual network packet traffic by traversing a gateway that typically restricts such traffic based on network policies. Further, one embodiment's use of a single matching operation between UPN-ID's of each egress packet and the endpoint/access device is scalable and efficient, as only a single UPN-ID is needed to be associated with each endpoint of a dynamic user private network; and only a one matching operation is required (e.g., in contrast to policy-based filtering such as performed using access control lists).

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1A:
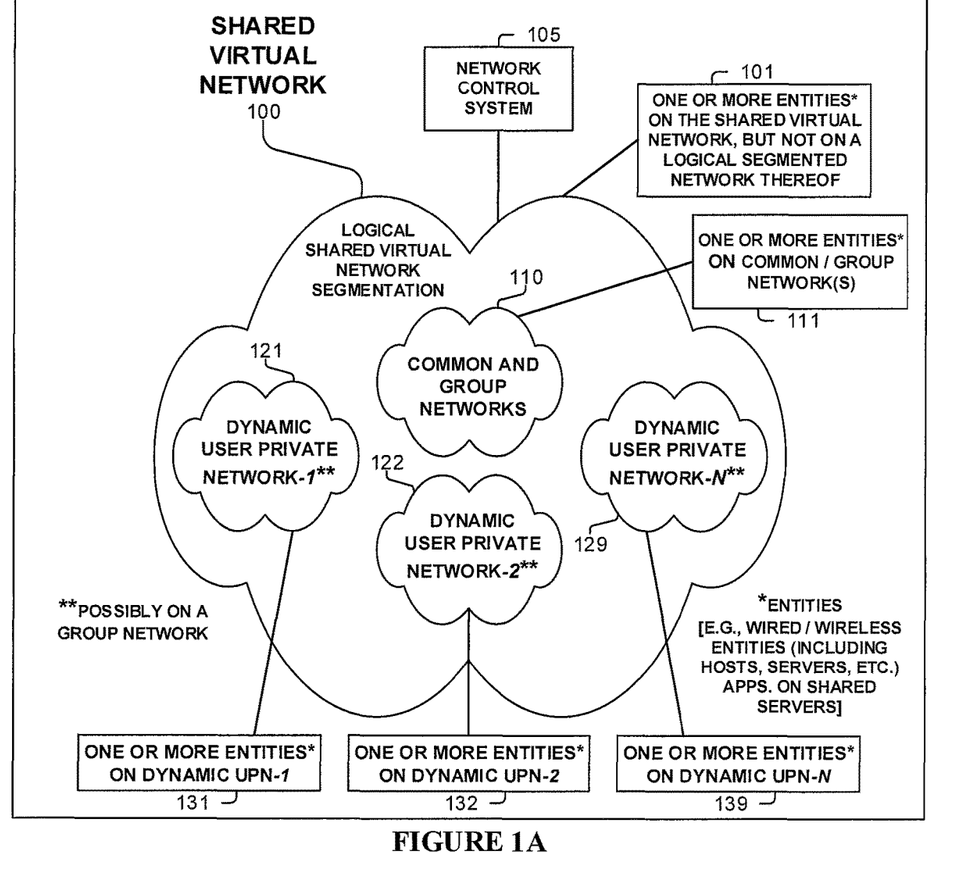
FIG. 1A illustrates a network operating according to one embodiment.

FIG. 1A illustrates a shared virtual network 100 operating according to one embodiment. As shown, shared virtual network 100 is logically segmented into multiple dynamic user private networks 121-129 respectively communicatively coupled with one or more entities 131-139, and one or more common and/or group networks 110. In one embodiment, a dynamic user private network (121-129) may also be part of a common and/or group network (110). In one embodiment, network control system 105 maintains the dynamic logical segmentation of shared virtual network 100. In one embodiment, network control system 105 comprises one or more systems (e.g., standalone or shared devices) providing the network segmentation and other functionality (e.g., authentication). In one embodiment, such a system includes, but not limited to, an Operations, Administration, Maintenance, and/or Provisioning (OAM-P) system, a network management system, a controller, a network control platform, a network data platform, an identity services engine (ISE), a digital network architecture center (DNAC) (e.g., including design, policy, provisioning, and/or assurance applications), a cloud service, and a wireless local area network controller (WLC).

A use case of one embodiment includes a university operating a shared virtual network (100). Common entities (111), on common network(s) (110) include shared fileservers, hosts, and/or printers. Group networks (110) represent various categories of users, such as, but not limited to, different disciplines and administration. Multiple students and members of faculty and administration are each associated with their own dynamic user private network (121-129) and associated entities (121-129).

In one embodiment, each of multiple students owns a different one of the dynamic user private network (121-129), and typically associates therewith multiple wired (e.g., in a dorm room) and/or wireless entities (121-129), such as, but not limited to, smart phones, tablets, video devices, audio devices, laptops, computers, fileservers. Thus, packet traffic is isolated among dynamic user private networks (121-129). As disclosed herein, one embodiment provides automated and seamless movement of an entity (132) on second dynamic user private network 122 to be on first dynamic user private network 121, providing communication among this entity and other entities (131).

Figure 1B:
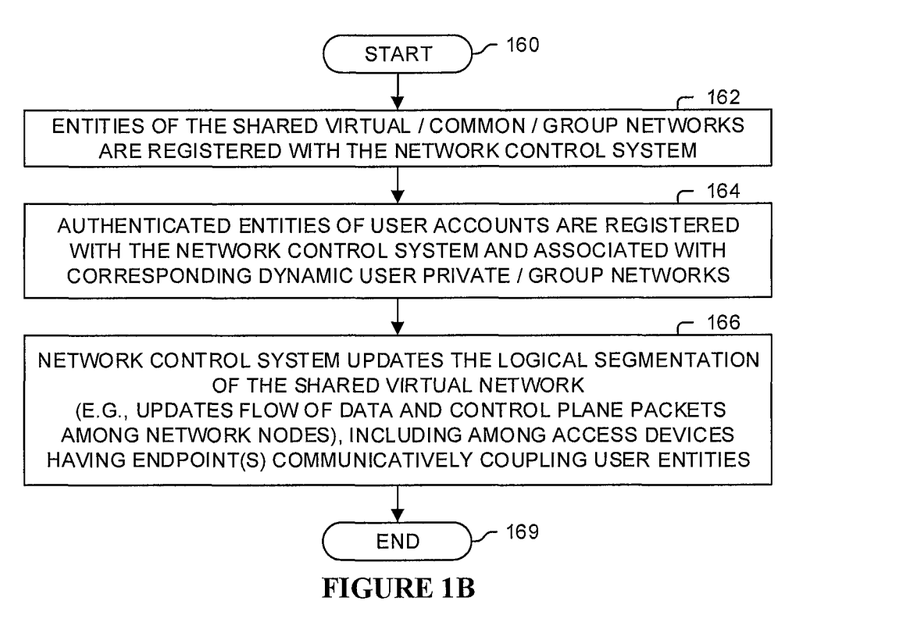
FIG. 1B illustrates a process according to one embodiment.

FIG. 1B illustrates a process according to one embodiment. Processing begins with processing block 160. In processing block 162, entities of the shared virtual, common, and group networks are registered with the network control system. In processing block 164, authenticated entities of user accounts are registered with the network control system and associated with corresponding dynamic user private and/or group networks. In processing block 166, the network control system updates the logical segmentation of the shared virtual network (e.g., updates flow of data and control plane packets among network nodes), including among access devices having endpoint(s) communicatively coupling user entities. Processing of the flow diagram of FIG. 1B is complete as indicated by processing block 169.

Figure 1C:
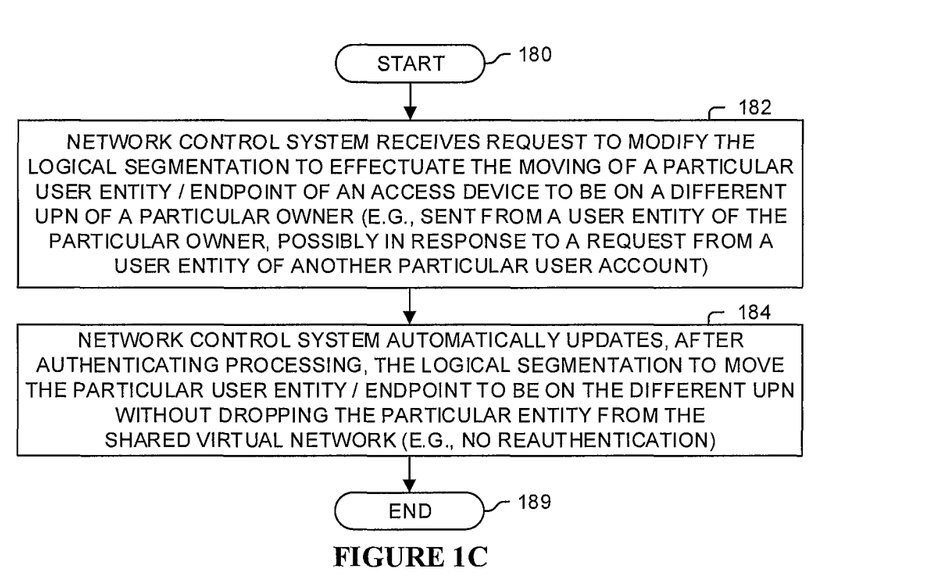
FIG. 1C illustrates a process according to one embodiment.

FIG. 1C illustrates a process according to one embodiment. Processing begins with processing block 180. In processing block 182, the network control system receives a request to modify the logical segmentation to effectuate the moving of a particular user entity/endpoint of an access device to be on a different user private network (UPN) of a particular owner (e.g., sent from a user entity of the particular owner, possibly in response to a request from a user entity of another particular user account). In processing block 184, the network control system automatically updates, typically after authenticating processing, the logical segmentation of the shared virtual network to move the particular user entity/endpoint to be on the different UPN while maintaining its communicatively coupling to the shared virtual network. Processing of the flow diagram of FIG. 1C is complete as indicated by processing block 189.

Figure 2A:
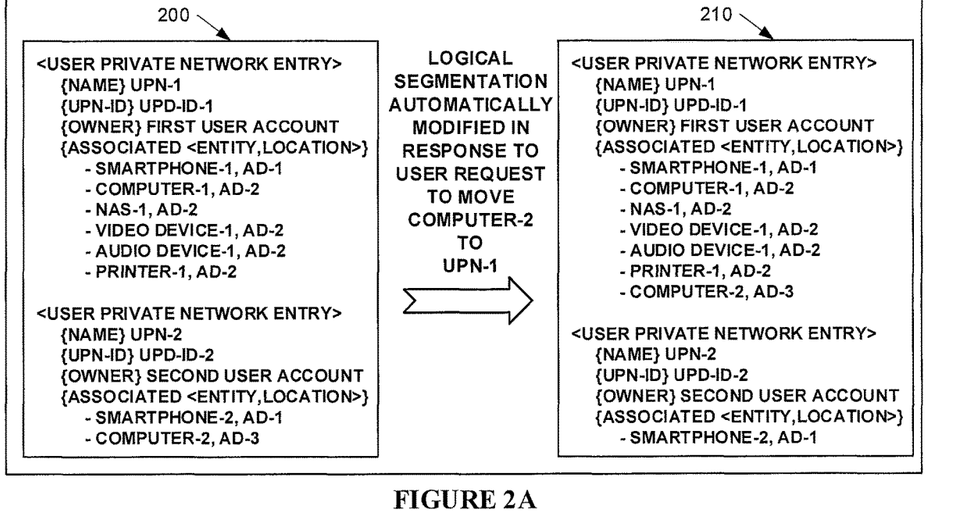
FIG. 2A illustrates a data structure according to one embodiment.

FIG. 2A illustrates two different states (200, 210) of a data structure according to one embodiment.

In state 200, the data structure represents two user private networks UPN-1 and UPN-2. As shown, UPN-1 is associated with UPN-ID-1; is owned by user account First User Account; and is associated with multiple entity tuples of <user entity, location> of: <smartphone-1, access device-1 (AD-1)>, <computer-1, AD-2>, <network-attached storage-1, AD-2>, <video device-1, AD-2>, <audio device-1, AD-2>, and <printer-1, AD-2>. As shown, UPN-2 is associated with UPN-ID-2; is owned by user account Second User Account; and is associated with multiple entity tuples of: <smartphone-2, AD-1>, and <computer-2, AD-3>.

In response to a user-initiated request to move Computer-2 to UPN-1, the dynamic logical segmentation of the shared virtual network is modified as represented in state 210 of the data structure. As shown, the difference between states 200 and 210 is that Computer-2 is now associated with UPN-1 (still owned by First User Account) and no longer with UPN-2. Note, UPN-1 remains owned by First User Account. Computer-2 is moved while maintaining connectivity with access device AD-3.

Figure 2B:
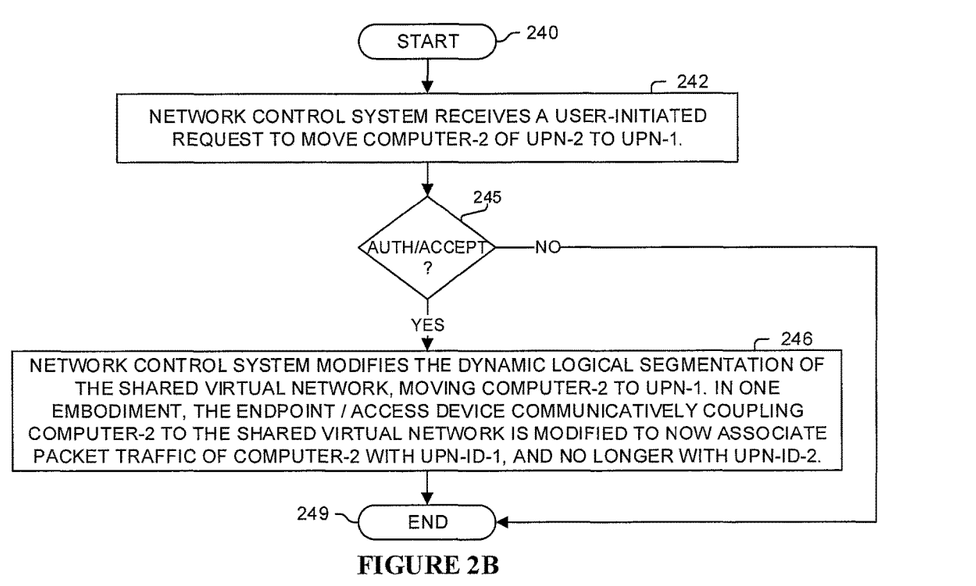
FIG. 2B illustrates a process according to one embodiment.

FIG. 2B illustrates a process according to one embodiment. Processing begins with processing block 240. In processing block 242, the network control system receives a user-initiated request to move Computer-2 of UPN-2 to UPN-1. As determined in processing block 245, if the movement is authorized and/or accepted (e.g., by the user account that is the owner of UPN-1, and/or by the network control system), then processing proceeds to processing block 246; otherwise, processing proceeds directly to processing block 249.

Continuing with processing block 246, the network control system modifies the logical segmentation of the shared virtual network, moving Computer-2 to UPN-1. In one embodiment, the endpoint/access device communicatively coupling Computer-2 to the shared virtual network is modified to now associate packet traffic of Computer-2 with UPN-ID-1, and no longer with UPN-ID-2. Processing proceeds to processing block 249.

Continuing with processing block 249, processing of the flow diagram of FIG. 2B is complete as indicated by processing block 249.

Figure 3A:
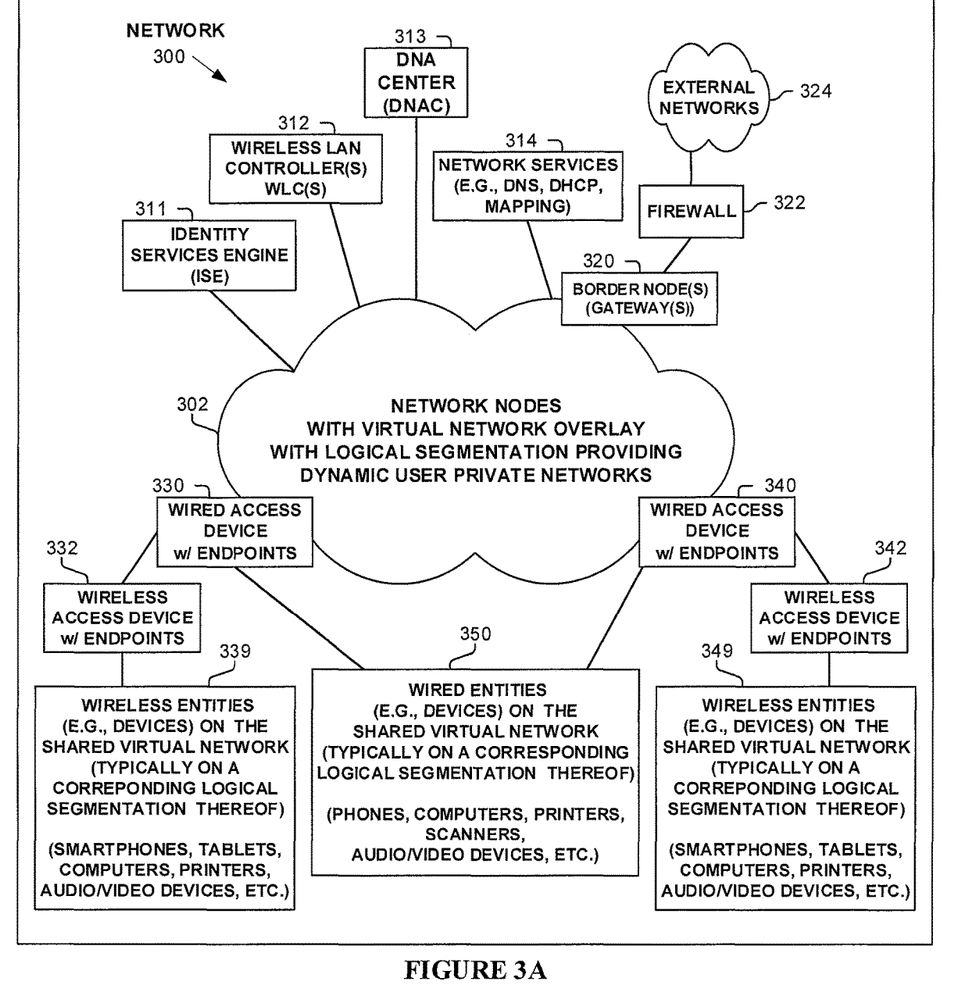
FIG. 3A illustrates a network operating according to one embodiment.

FIG. 3A illustrates a network 300 (e.g., a campus or enterprise fabric) operating according to one embodiment. As shown, network 302 includes a network of physical network nodes with a virtual network overlay with logical segmentation providing multiple dynamic user private networks. In one embodiment, the network control system that maintains the dynamic logical segmentation includes identity services engine (ISE), wireless LAN controller(s) (WLC(s)) 312, digital network architecture center (DNAC) 313, wired access devices (e.g., fabric edge devices) with endpoints 330, 340; and wireless access devices (e.g., access point devices) with endpoints 332, 342. Network 300 includes network services 314 (e.g., DNS, DHCP, mapping), border node(s) 320 (typically also performing gateway functionality) and firewall 322 coupling to external networks 324 (e.g., including the Internet). Wired entities 350 are communicatively coupled to the shared virtual network via access devices 330, 340; and wireless entities 339, 349 are communicatively coupled to the shared virtual network via access devices 332, 342.

Figure 3B:
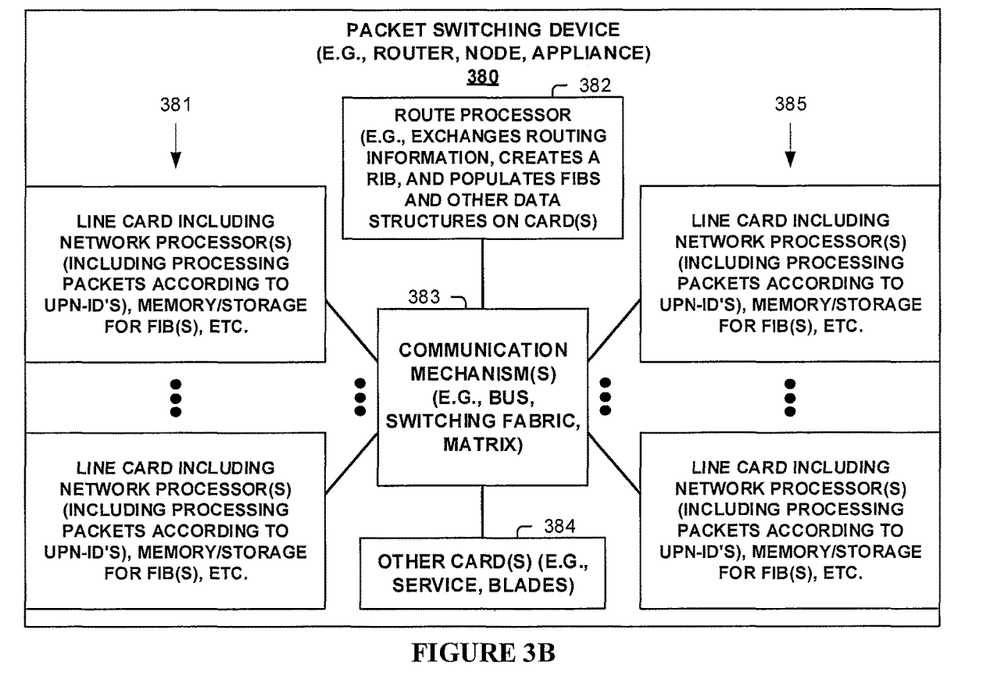
FIG. 3B illustrates a packet switching device according to one embodiment.
Figure 3C:
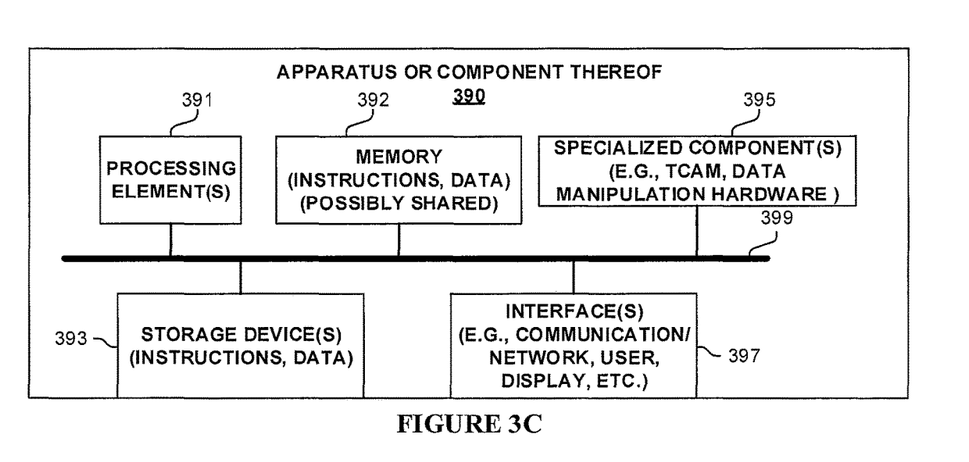
FIG. 3C illustrates an apparatus or component thereof according to one embodiment.

FIGS. 3B-C and their discussion herein provide a description of various network nodes according to one embodiment.

FIG. 3B illustrates one embodiment of a packet switching device 380 (e.g., router, node, switching, appliance, gateway) according to one embodiment. As shown, packet switching device 380 includes multiple line cards 381 and 385, each with one or more network interfaces for sending and receiving packets over communications links (e.g., possibly part of a link aggregation group), and with one or more processing elements that are used in one embodiment associated with dynamic user private networks segmented within a shared virtual network, with a network control system maintaining dynamic logical segmentation of the shared virtual network that provides a plurality of dynamic user private networks. Packet switching device 380 also has a control plane with one or more processing elements (e.g., Route Processor(s)) 382 for managing the control plane and/or control plane processing of packets associated with dynamic user private networks segmented within a shared virtual network, with a network control system maintaining dynamic logical segmentation of the shared virtual network that provides a plurality of dynamic user private networks. Packet switching device 380 also includes other cards 384 (e.g., service cards, blades) which include processing elements that are used in one embodiment to process (e.g., forward/send, drop, manipulate, change, modify, receive, create, duplicate, encapsulation, decapsulation, perform operations data processing functionality, apply a service according to one or more service functions) packets associated with dynamic user private networks segmented within a shared virtual network, with a network control system maintaining dynamic logical segmentation of the shared virtual network that provides a plurality of dynamic user private networks, and some hardware-based communication mechanism 383 (e.g., bus, switching fabric, and/or matrix, etc.) for allowing its different entities 381, 382, 384 and 385 to communicate. Line cards 381 and 385 typically perform the actions of being both an ingress and egress line card, in regards to multiple other particular packets and/or packet streams being received by, or sent from, packet switching device 380. In one embodiment, operations data processing and storage functions are implemented on line cards 381, 385.

FIG. 3C is a block diagram of an apparatus 390 (e.g., host, router, node, destination, or portion thereof) used in one embodiment associated with dynamic user private networks segmented within a shared virtual network, with a network control system maintaining dynamic logical segmentation of the shared virtual network that provides a plurality of dynamic user private networks. In one embodiment, apparatus 390 performs one or more processes, or portions thereof, corresponding to one of the flow diagrams illustrated or otherwise described herein, and/or illustrated in another diagram or otherwise described herein.

In one embodiment, apparatus 390 includes one or more processor(s) 391 (typically with on-chip memory), memory 392 (possibly shared memory), storage device(s) 393, specialized component(s) 395 (e.g. optimized hardware such as for performing lookup, packet processing (e.g., including packet encapsulation, decapsulation, adding corresponding UPN-ID's to packets) and/or service function operations; associative memory; binary and/or ternary content-addressable memory; Application Specific Integrated Circuit(s), cryptographic hash hardware, etc.), and interface(s) 397 for communicating information (e.g., sending and receiving packets, user-interfaces, displaying information, etc.), which are typically communicatively coupled via one or more communications mechanisms 399 (e.g., bus, links, switching fabric, matrix), with the communications paths typically tailored to meet the needs of a particular application.

Various embodiments of apparatus 390 may include more or fewer elements. The operation of apparatus 390 is typically controlled by processor(s) 391 using memory 392 and storage device(s) 393 to perform one or more tasks or processes. Memory 392 is one type of computer-readable/ computer-storage medium, and typically comprises random access memory (RAM), read only memory (ROM), flash memory, integrated circuits, and/or other memory components. Memory 392 typically stores computer-executable instructions to be executed by processor(s) 391 and/or data which is manipulated by processor(s) 391 for implementing functionality in accordance with an embodiment. Storage device(s) 393 are another type of computer-readable medium, and typically comprise solid state storage media, disk drives, diskettes, networked services, tape drives, and other storage devices. Storage device(s) 393 typically store computer-executable instructions to be executed by processor(s) 391 and/or data which is manipulated by processor(s) 391 for implementing functionality in accordance with an embodiment.

Figure 4A:
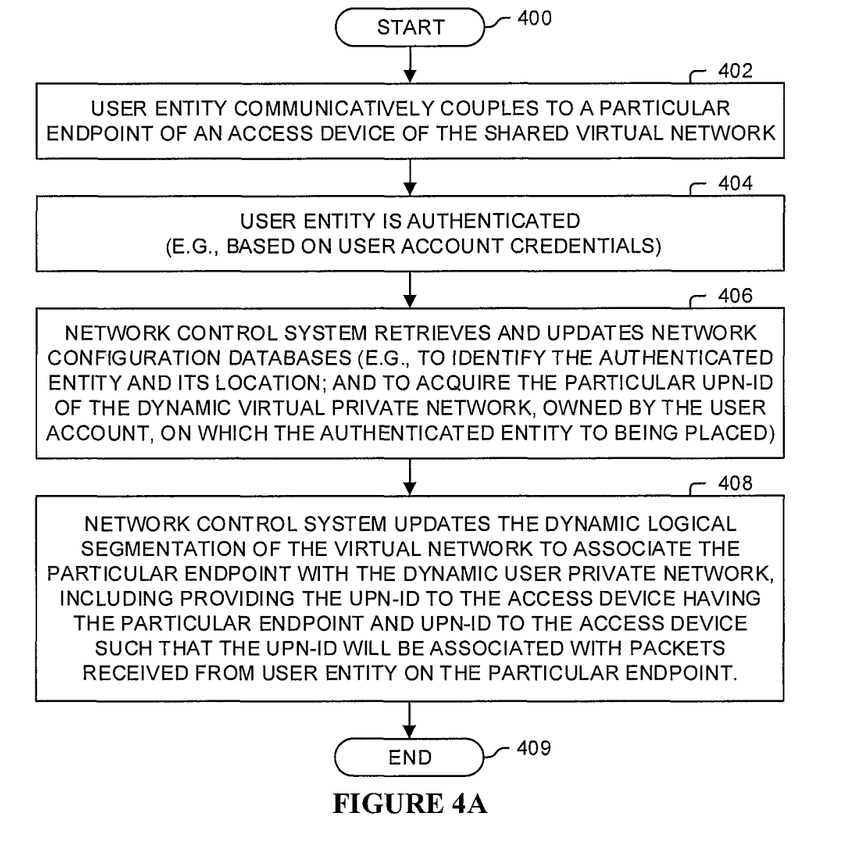
FIG. 4A illustrates a process according to one embodiment.

FIG. 4A illustrates a process according to one embodiment. Processing begins with processing block 400. In processing block 402, a user entity communicatively couples to a particular endpoint of an access device of the shared virtual network, In processing block 404, the user entity is authenticated (e.g., based on user account credentials). In processing block 406, the network control system retrieves and updates network configuration databases (e.g., to identify the authenticated entity and its location; and to acquire the particular UPN-ID of the dynamic virtual private network, owned by the user account, on which the authenticated entity to being placed). In processing block 408, the network control system updates the dynamic logical segmentation of the virtual network to associate the particular endpoint with the dynamic user private network, including providing the UPN-ID to the access device having the particular endpoint and UPN-ID to the access device such that the UPN-ID will be associated with packets received from user entity on the particular endpoint. Processing of the flow diagram of FIG. 4A is complete as indicated by processing block 409.

Figure 4B:
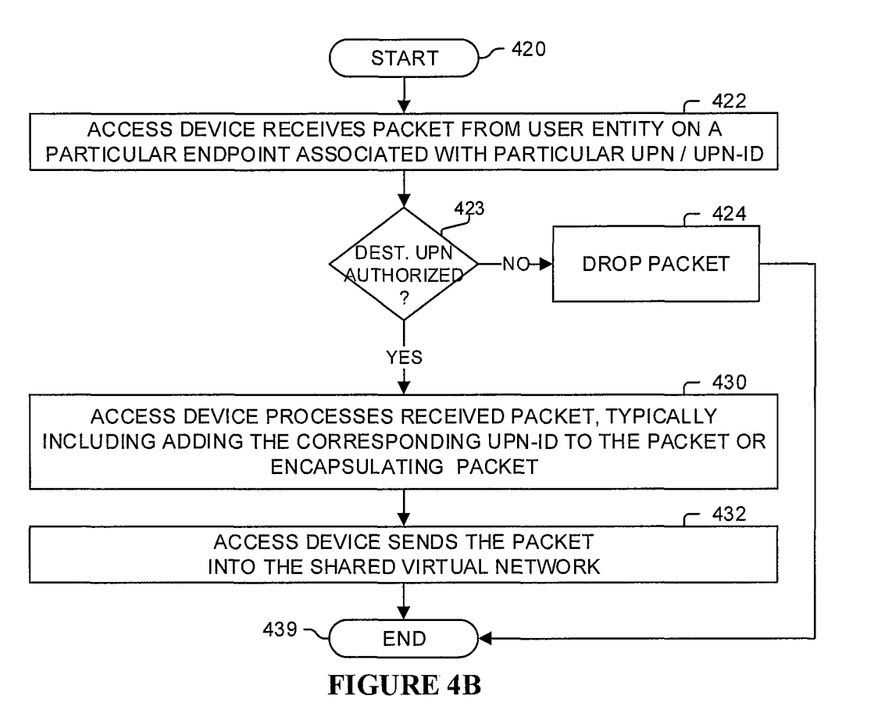
FIG. 4B illustrates a process according to one embodiment.

FIG. 4B illustrates a process according to one embodiment. Processing begins with processing block 420. In processing block 422, the access device receives a packet from user entity on a particular endpoint associated with the particular UPN associated with a particular UPN-ID.

One embodiment performs ingress filtering of unicast packets that are on a different dynamic user private network. As determined in processing block 423, if the destination endpoint according to the current logical segmentation is that of a different user private network (e.g., packet is not authorized for the destination endpoint), then processing proceeds to processing block 424; otherwise, processing proceeds to processing block 430.

Continuing in processing block 424, the packet is dropped, with processing proceeding directly to processing block 439.

Continuing with processing block 430, the access device further processes the received packet, including adding the corresponding UPN-ID to the received packet or to an encapsulating packet including the received packet. In processing block 432, the access device sends the received packet (typically in an encapsulating packet) into the shared virtual network.

Continuing with processing block 439, processing of the flow diagram of FIG. 4B is complete as indicated by processing block 439.

Figure 4C:
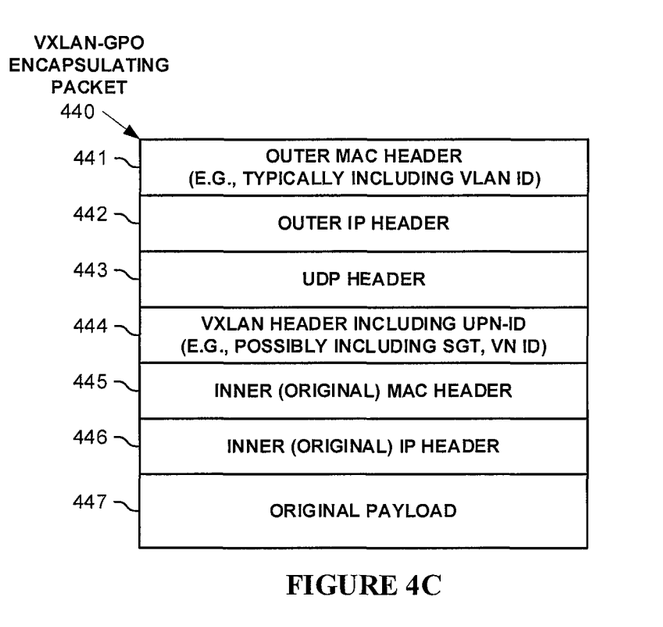
FIG. 4C illustrates an encapsulating packet according to one embodiment.

FIG. 4C illustrates an encapsulating VXLAN Group Policy Option (VXLAN-GPO) encapsulating packet 440 according to one embodiment. As shown, encapsulating packet 440 includes fields 441-447. Field 441 includes an outer MAC header that typically includes a VLAN ID providing segmentation among Virtual Route Forwarding domains. Field 442 includes an outer Internet Protocol (IP) header. Field 443 includes a User Datagram Protocol (UDP) header.

Field 444 includes a VXLAN header that includes the associated UPN-ID of a dynamic user packet network, if one is added by an access device. In one embodiment, VXLAN header 444 also includes a SGT to identify a corresponding group segmentation. In one embodiment, VXLAN header 444 also includes a VN ID providing segmentation among Virtual Route Forwarding domains.

Field 445 includes an inner MAC header, that of the received original packet. Field 446 includes an inner IP header, that of the received original packet. Field 447 includes the payload of the received original packet.

Figure 4D:
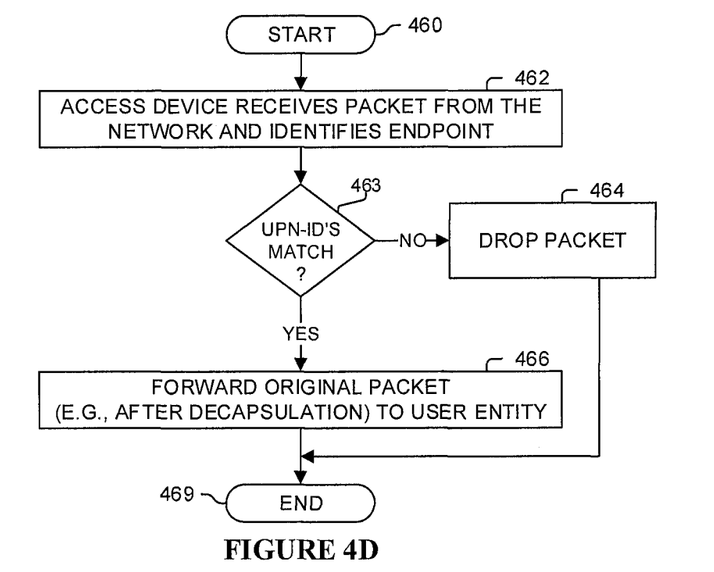
FIG. 4D illustrates a process according to one embodiment.

FIG. 4D illustrates a process according to one embodiment. Processing begins with processing block 460. In processing block 462, a packet (including a received UPN-ID) is received from a network node on an endpoint (associated with an endpoint UPN-ID) of an access device. As determined in processing block 463, if the received UPN-ID and the endpoint UPN-ID match, then processing proceeds to processing block 466; otherwise, processing proceeds to processing block 464.

Continuing in processing block 464, the packet is dropped, with processing proceeding directly to processing block 469.

Continuing with processing block 466, the access device sends the original packet (without a UPN-ID and typically after being decapsulated from the received encapsulating packet) to the communicatively coupled user entity or entities. Processing proceeds to processing block 469.

Continuing with processing block 469, processing of the flow diagram of FIG. 4D is complete as indicated by processing block 469.

Figure 4E:
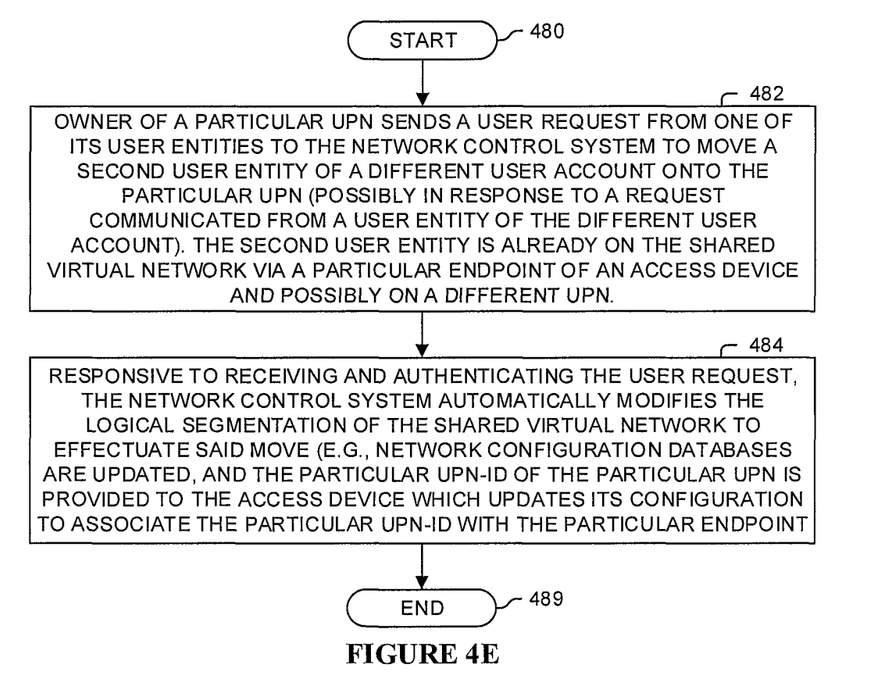
FIG. 4E illustrates a process according to one embodiment.

FIG. 4E illustrates a process according to one embodiment. Processing begins with processing block 480. In processing block 482, the owner of a particular UPN sends a user request from one of its user entities to the network control system to move a second user entity of a different user account onto the particular UPN (possibly in response to a request communicated from a user entity of the different user account). The second user entity is already on the shared virtual network via a particular endpoint of an access device and possibly on a different UPN. In processing block 484, being responsive to receiving and authenticating the user request, the network control system automatically modifies the logical segmentation of the shared virtual network to effectuate said move (e.g., network configuration databases are updated, and the particular UPN-ID of the particular UPN is provided to the access device which updates its configuration to associate the particular UPN-ID with the particular endpoint for associating with future received packets from a communicatively coupled entity). Processing of the flow diagram of FIG. 4E is complete as indicated by processing block 489.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
 maintaining, by a network control system, a dynamic logical segmentation of a shared virtual network overlaying a physical network comprising a plurality of network nodes, wherein the dynamic logical segmentation comprises a plurality of dynamic user private networks, with a plurality of user entities communicatively coupled to respective private virtual networks of the plurality of dynamic user private networks in which each respective private virtual network has controlled access based on a respective group of entity tuples that define one or more of a respective user entity that is authorized to access the respective private virtual network and one or more respective access device that is authorized to access the respective private virtual network, with the plurality of dynamic user private networks comprising a first dynamic user private network, with a plurality of user accounts associated with the shared virtual network, and with the plurality of user accounts comprising a first user account; and responsive in real-time to automated processing of a received electronic user request, automatically modifying, by the network control system, the dynamic logical segmentation to change a user entity from being on the shared virtual network but not on the first dynamic user private network to being on the first dynamic user private network without being disconnected from the shared virtual network by adding an entity tuple associated with the received electronic user request to a first group of entity tuples associated with the first dynamic user private network, wherein the received electronic user request indicates a request for the user entity to be placed on the first dynamic user private network.

2. The method of claim 1, wherein:
the first user account is an owner of the first dynamic user private network;
the plurality of user accounts comprises a second user account owning a second dynamic user private network of the plurality of dynamic user private networks; and
the user entity was on the second dynamic user private network when the modifying of the dynamic logical segmentation was initiated.

3. The method of claim 2, wherein the user entity is owned by the second user account; and wherein the modifying of the dynamic logical segmentation does not move one or more other second entities owned by the second user account and currently being on the second dynamic user private network to being on the first dynamic user private network.

4. The method of claim 2, wherein the received electronic user request is sent from a first initiating user entity on the shared virtual network and owned by the first user account.

5. The method of claim 4, wherein the first initiating user entity receives a second received request identifying a request for the user entity to be placed on the first dynamic user private network; and wherein the received electronic user request is sent by the first initiating user entity in response to the second received request.

6. The method of claim 4, wherein the first initiating user entity receives a second received request identifying a request for the user entity to be placed on the first dynamic user private network; and wherein the received electronic user request is sent by the first initiating user entity in response to the second received request and user input on the first initiating user entity authorizing the request for the user entity to be placed on the first dynamic user private network.

7. The method of claim 2, wherein the received electronic user request is sent from a second initiating user entity on the shared virtual network and owned by the second user account.

8. The method of claim 1, wherein the user entity is a mobile device.

9. The method of claim 1, wherein each of the plurality of dynamic user private networks is owned by a different user account of the plurality of user accounts.

10. The method of claim 1, wherein each of the plurality of dynamic user private networks is associated with a unique User Private Network Identifier (UPN-ID); and wherein the shared virtual network associates each packet received from an entity on one of the plurality of dynamic user private networks with a corresponding unique UPN-ID.

11. The method of claim 10, comprising:
sending, by the user entity communicatively coupled to the first dynamic user private network via a first network access device of the plurality of network nodes, a first plurality of packets to a second user entity communicatively coupled to the first dynamic user private network via a second network access device of the plurality of network nodes; and for each first original packet of the first plurality of packets received and after having identified that the second user entity is associated with the first dynamic user private network, encapsulating, via the first network access device, the first original packet in an encapsulating packet comprising the unique UPN-ID corresponding to the first dynamic user private network and then sending the encapsulating packet towards the second network access device.

12. The method of claim 10, wherein associating each packet comprises encapsulating the packet in an encapsulating packet comprising the corresponding unique UPN-ID.

13. The method of claim 12, comprising:
sending, by the user entity communicatively coupled to the first dynamic user private network via a first network access device of the plurality of network nodes, a first plurality of packets to a second user entity communicatively coupled to the first dynamic user private network via a second network access device of the plurality of network nodes;

for each first original packet of the first plurality of packets received, encapsulating, via the first network access device, the first original packet in an encapsulating packet comprising the unique UPN-ID corresponding to the first dynamic user private network and then sending the encapsulating packet towards the second network access device; and egress processing based on the unique UPN-ID corresponding to the first dynamic user private network by the second network access device for each received packet of the first plurality of packets, wherein the egress processing comprises:
dropping the received packet in response to the received packet not including the unique UPN-ID corresponding to the first dynamic user private network, and
decapsulating an original packet from the received packet and forwarding the original packet to the second user entity responsive to the received packet comprising the unique UPN-ID corresponding to the first dynamic user private network.

14. The method of claim 13, further comprising, prior to the encapsulating of the first original packet, identifying, by the first network access device, that the second user entity is associated with the unique UPN-ID corresponding to the first dynamic user private network.

15. The method of claim 1, comprising:
sending, by the user entity communicatively coupled to the first dynamic user private network via a first network access device of the plurality of network nodes, a first plurality of packets to a second user entity communicatively coupled to the first dynamic user private network via a second network access device of the plurality of network nodes; and for each first original packet of the first plurality of packets received and after having identified that the second user entity is associated with the first dynamic user private network, sending, by the first network access device, the first original packet, natively or in an encapsulating packet, towards the second network access device.

16. A method, comprising:

maintaining, by a network control system, a dynamic logical segmentation of a shared virtual network overlaying a physical network comprising a plurality of network nodes, with the dynamic logical segmentation comprising a plurality of dynamic user private networks, with a plurality of user entities communicatively coupled to respective private virtual networks of the plurality of dynamic user private networks via access devices of the plurality of network nodes in which each respective private virtual network has controlled access based on a respective group of entity tuples that define one or more of a respective user entity that is authorized to access the respective private virtual network and one or more respective access device that is authorized to access the respective private virtual network, and with communication between the plurality of entities via the shared virtual network, without traversing a gateway device, constrained according to the dynamic logical segmentation; and responsive in real-time to automated processing of a received electronic user request, automatically modifying, via the network control system the dynamic logical segmentation to associate a corresponding one of the plurality of entities to a corresponding one of the plurality of dynamic user private networks without disconnecting the corresponding one of the plurality of entities from the shared virtual network by adding an entity tuple associated with the received electronic user request to a first group of entity tuples associated with the corresponding one of the plurality of dynamic user private networks, and with both of the corresponding one of the plurality of entities and the corresponding one of the plurality of dynamic user private networks being identified in the received electronic user request.

17. The method of claim 16, wherein each of the plurality of dynamic user private networks are associated with a different one of a plurality of user accounts of the shared virtual network; and wherein the received electronic user request is authorized via a corresponding one of the plurality of entities associated with the user account associated with the corresponding one of the plurality of dynamic user private networks.

18. A network, comprising:

a plurality of physical network nodes providing a shared virtual network, with the plurality of provider network nodes using filtering of packet traffic according to logical segmentation of the shared virtual network to provide a plurality of dynamic user private networks within the shared virtual network that prevents packets being communicated, not via a gateway device, between user entities associated with different dynamic user private networks of the plurality of dynamic user private networks, with each of the plurality of dynamic user private networks associated with a different user account of a plurality of user accounts of the shared virtual network and in which each respective dynamic user private network of the plurality of dynamic user private networks has controlled access based on a respective group of entity tuples that define one or more of a respective user entity that is authorized to access the respective dynamic user private network and one or more respective access device that is authorized to access the respective dynamic user private network, with each of the plurality of dynamic user private networks associated with one or more logical or physical access points as defined by the group of entity tuples, and with the plurality of dynamic user private networks communicatively coupling entities via the logical or physical access points on respective user private networks of the plurality of dynamic user private networks; and a network control system, responsive in real-time to automated processing of received electronic dynamic user private network modification requests received from corresponding user accounts of the plurality of user accounts, performing automated modification of the dynamic logical segmentation of the shared virtual network defining which logical or physical access points of the shared virtual network belong to which of the plurality of dynamic user private networks by adding an entity tuple associated with a user private network modification request to a first group of entity tuples associated with a first dynamic user private network of the plurality of dynamic user private networks and associated with the user private network modification request.

19. The shared virtual network of claim 18, wherein the automated modification of the dynamic logical segmentation of the shared virtual network comprises changing a logical or physical access points from being associated with a packet to a different dynamic user private network of the plurality of dynamic user private networks for one or more of the received electronic dynamic user private network modification requests.

20. The shared virtual network of claim 18, wherein the filtering of packet traffic comprises dynamic user private network egress packet filtering of each packet of a plurality packets based on a matching of:

a packet marking User Private Network Identifier (UPN-ID) associated with the logical or physical access points on which the packet was received from a sending user entity; and an egress UPN-ID associated with the logical or physical access points from which the packet is to be communicated to a receiving user entity, wherein the packet marking UPN-ID is added to the packet or included in an encapsulating packet encapsulating the packet.

* * * * *